March 28, 1944.  L. J. HARRISS ET AL  2,345,045
APPARATUS FOR MAKING PIES
Filed Aug. 27, 1941   4 Sheets-Sheet 2
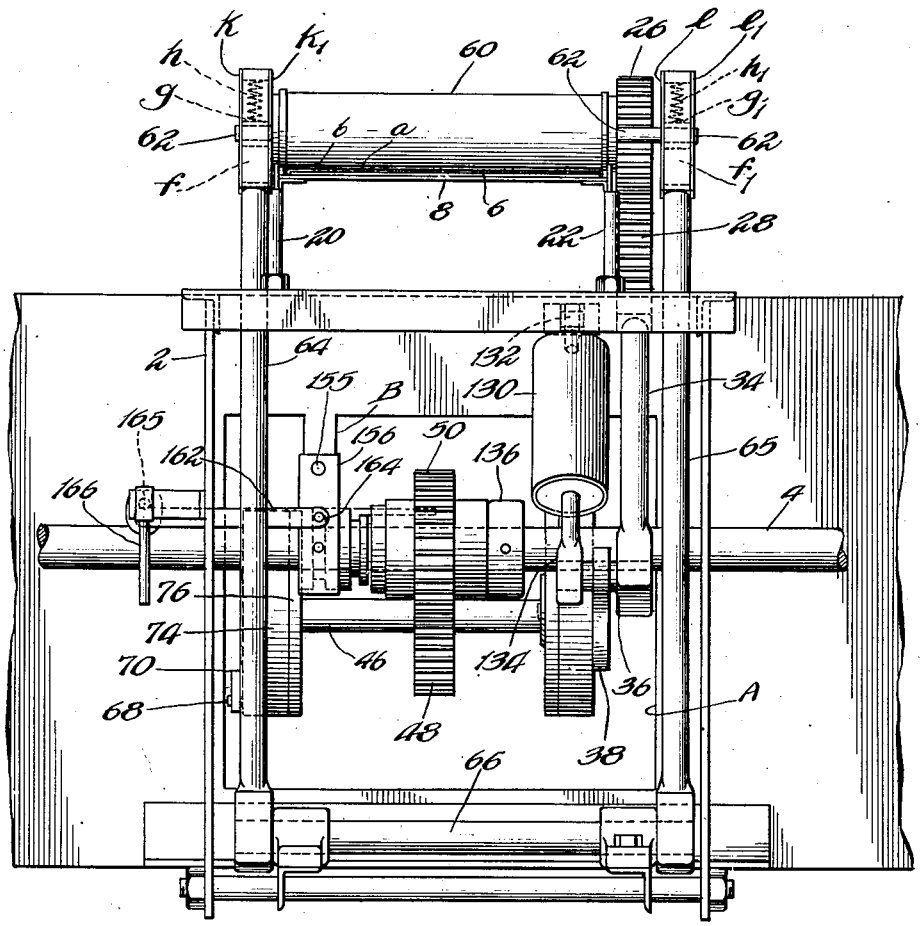
INVENTORS.
Lloyd J. Harriss
BY Bernard Lambers
ATTYS.

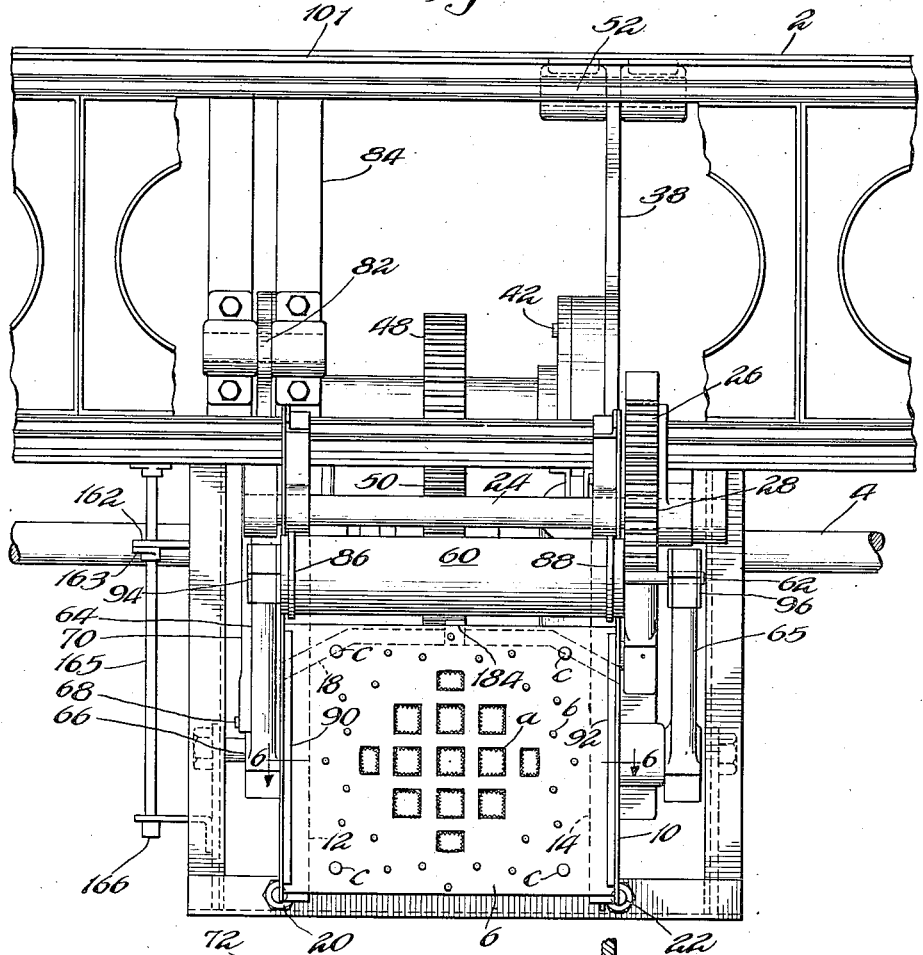

March 28, 1944. L. J. HARRISS ET AL 2,345,045
APPARATUS FOR MAKING PIES
Filed Aug. 27, 1941  4 Sheets-Sheet 3
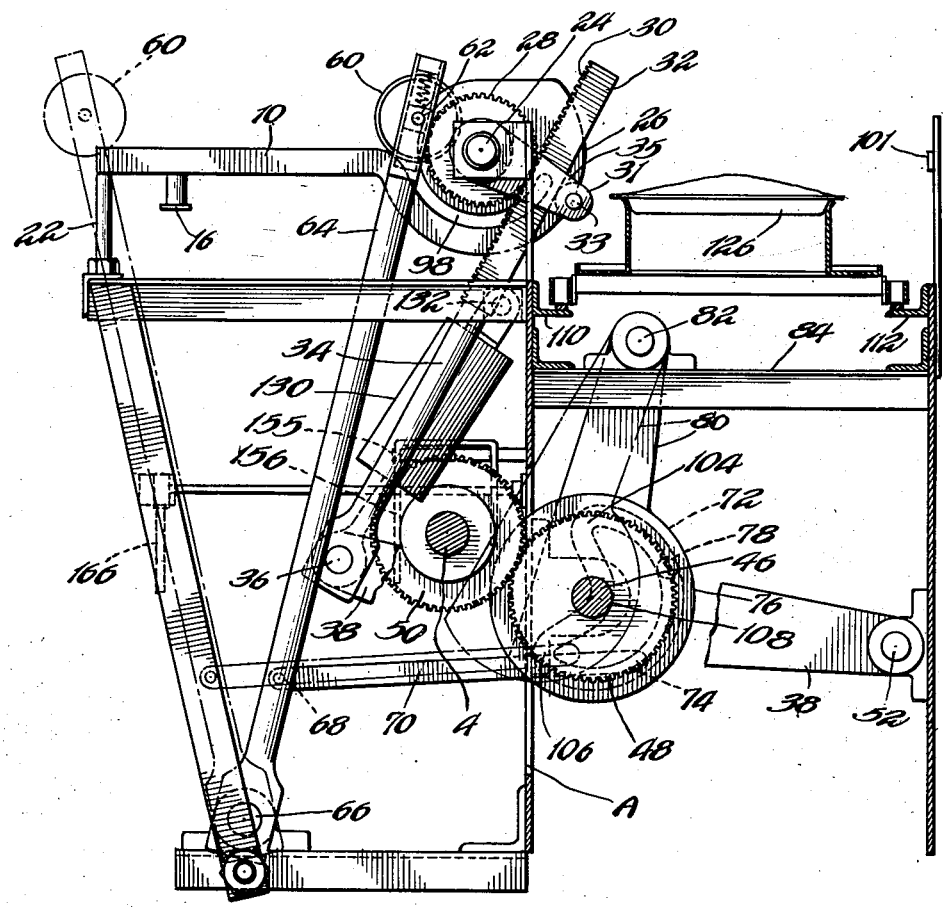
Fig. 5.
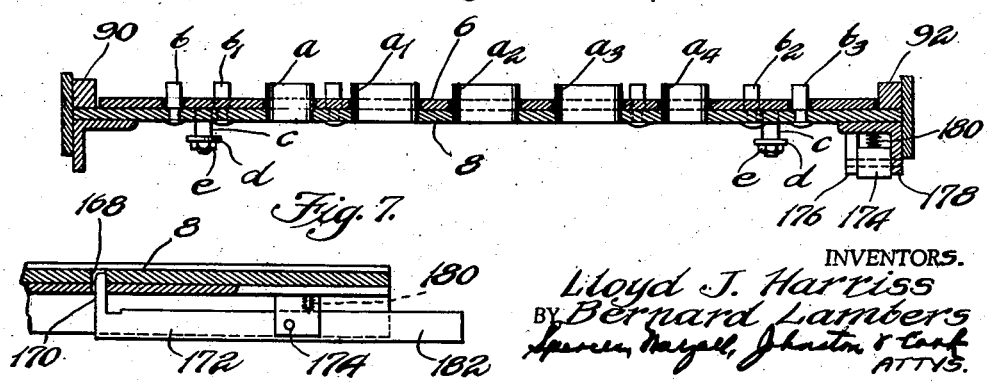
Fig. 6.
Fig. 7.
INVENTORS.
Lloyd J. Harriss
BY Bernard Lambers
ATTYS.

INVENTORS
Lloyd J. Harriss
BY Bernard Lambers
ATTYS.

Patented Mar. 28, 1944

2,345,045

UNITED STATES PATENT OFFICE 2,345,045

APPARATUS FOR MAKING PIES

Lloyd J. Harriss, Kenilworth, and Bernard Lambers, Oak Park, Ill.; said Lambers assignor to said Harriss Application August 27, 1941, Serial No. 408,452

17 Claims. (Cl. 107—1)

This invention relates to an apparatus for making pies, and more particularly to an apparatus for applying a top crust to pies automatically.

One of the objects of the invention is to provide a new and improved type of machine for automatically applying a top crust to pies while the latter are being carried by a conveyor system.

Other objects and advantages of the invention will be apparent by reference to the following description in conjunction with the accompanying drawings in which:

Figure 1 represents a top plan view of a type of apparatus which may be employed in accordance with the invention to apply a top crust to pies or other pastry products;

Figure 2 represents a cross sectional view of a portion of the apparatus shown in Figure 1, taken along the line 2—2 of Figure 3;

Figure 3 represents a front or elevational view of the apparatus shown in Figure 1;

Figure 4 is a detail view of one of the cam elements in the apparatus shown in Figures 1 to 3;

Figure 5 represents a side view with parts broken away of the apparatus shown in Figure 1, illustrating more particularly that portion of the apparatus which operates the mechanism for moving the roller, as described more fully hereinafter;

Figure 6 is a cross sectional view taken through the line 6—6 of Figure 1 and illustrating more particularly the mechanism for receiving the top crust;

Figure 7 illustrates a latch which is a part of the mechanism shown in Figure 6;

Referring to Figure 1, the apparatus illustrated comprises generally a conveyor system 2 which is driven by any suitable intermittent motion mechanism, not shown, from a shaft 4, the shaft 4 being driven in turn by any suitable driving means such as a motor, not shown. For the purpose of this description, the shaft 4 will be referred to as the main shaft, or driving shaft.

Figure 8:
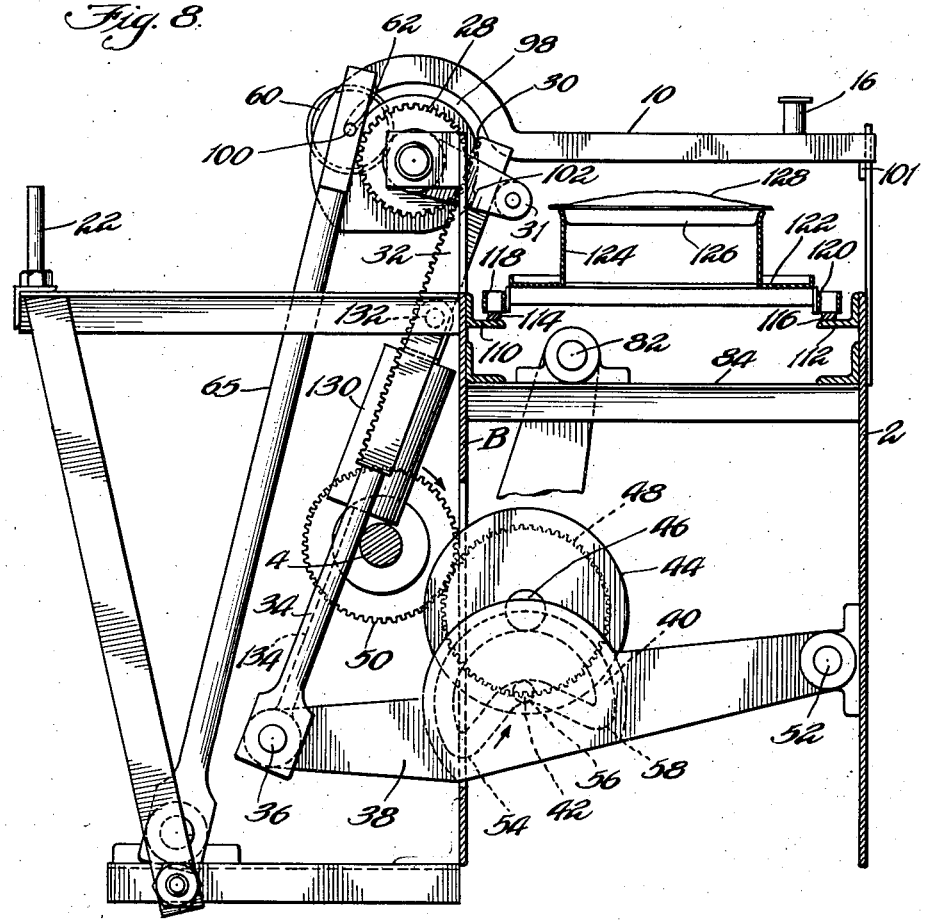
Figure 8 illustrates the mechanism for applying the top crust to a pie which is being carried on a conveyor system.

The purpose of the invention is to provide some means for applying to a pie automatically a top crust. The mechanism by means of which the crust is applied comprises principally a pair of plate-like members including a top plate 6 and a lower plate 8, as more clearly shown in Figure 6 and Figure 9. The plate assembly, including the plates 6 and 8, is supported by a supporting member 10, as shown in Figures 1, 5 and 8. The supporting member 10 preferably consists of a plurality of angle irons 12 and 14, which are held together near their outer ends by a cross-bar 16, as shown in Figure 5, and near the inner ends by another cross-bar 18, shown in dotted lines in Figure 1.

The entire assembly in the crust receiving position rests on a pair of supports 20 and 22 and is capable of movement around an axis, axle or shaft 24. As shown in Figure 5, the plate assembly 10 is supported by a rotary element 26 mounted on the shaft 24. The element 26 is fixed to a pinion 28 which in turn meshes with the gear teeth 30 of the reciprocating element 32, as shown in Figures 5 and 8. The gear teeth 30 are held against pinion 28 by a roller 31 supported on a shaft 33 on an arm 35, which in turn is supported by shaft 24.

The reciprocating element 32 is carried by a reciprocating shaft 34, as shown in Figures 5 and 8. The reciprocating shaft 34 is connected at point 36 to a cam carrying element 38, which is shown with parts broken away in Figure 5, and in full view in Figure 8. The cam carrying element 38 contains a central generally semi-circular cam track 40, as shown in Figure 8. Engaging with the cam track 40 is a pin 42, which is carried by and affixed to a circular element 44. The circular element 44 is in turn affixed to and rotated by a shaft 46. The shaft 46 is rotated by a gear 48 engaging with another gear 50, carried by the main shaft 4. As the circular member 44 is rotated, the pin 42 moves in the cam track 40 of the member 38 and causes the member 38 to reciprocate at intervals around the trunnion 52. This reciprocation occurs when the pin 42 is between point 54 and point 56 of the cam track 40. At the point 56, as shown in Figure 8, the reciprocation changes from one direction to the other. At this point the pie crust is discharged onto the pie and the crust carrying member 10 is about to be returned to its crust receiving position shown in Figure 5. During this return movement the cam pin 42 is moving from point 56 to point 58 in the cam track 40. When the cam pin reaches the point 58 it enters the circular portion of the cam track and while it is in this circular portion of the cam track there is no movement of the element 38 because the curvature of the cam track 40 in the circular portion thereof coincides with the curvature of the arc described by the pin 42. During this period of rest when the crust carrier 10 is in the position shown in Figure 5, a new crust is placed in position. It is after this new crust is placed in position that the crust roller 60, shown in Figures 5, comes into action.

When a new crust is placed in position, it is laid over the plate-like elements 6 and 8 which are in the positions shown in Figure 6. The plate-like element 8, which is the lower element in the crust receiving position, as shown in Figure 6, contains a number of corrugated cutting elements $a$, $a_1$, $a_2$, $a_3$ and $a_4$. When the crust dough is rolled down over these elements, a design is cut out, as shown in the plan view in Figure 1, and the main body of the crust dough enters the spaces in between the elements $a$ to $a_4$. The dough which is cut out drops down through holes in the aforesaid elements to a suitable receptacle, not shown. In order to hold the edges of the crust dough on the upper plate member 6 and to keep them from flopping over and getting out of position when the transfer member 10 is changed from the position shown in Figure 5 to the position shown in Figure 8, there are provided a plurality of staggered pins $b$, $b_1$, $b_2$, $b_3$, etc., as shown in Figure 6 and as generally indicated by the letter $b$ in Figure 1. The dough is pressed over these pins by the roller 60 and thus is held in position.

Figure 9:
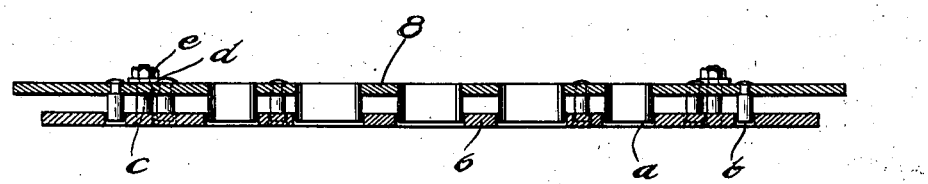
Figure 9 is a detail view similar to Figure 6 but showing the position of the crust carrying mechanism at the time that the crust is discharged onto the top of the pie.

It will be observed that the upper plate member 6, shown in Figure 6, is mounted loosely with respect to the lower plate member 8 and is capable of moving up and down around the cutting members $a$ and the pins $b$ as guide elements. The limit of movement is determined by the height of the guide elements $a$ and $b$, which in turn is determined by a plurality of guide bolts $c$, each provided with a washer $d$ and a nut $e$. The upper part of the guide bolt $c$ is fixed or riveted to the upper element 6. When the plates are reversed to discharge the crust, as shown in Figure 9, the normally upper plate 6 separates from the normally lower plate 8 and the weight of the plate pushes the dough away from the members $a$ and $b$.

The crust roller 60 is operated automatically in synchronism with the movement of the crust turner 10 and as previously pointed out, comes into action only when the crust turner 10 is in its position of rest, as shown in Figure 5. During this time the crust roller 60 moves from the full line position shown in Figure 5 to the dotted line position and back again, thereby rolling the crust into the elements $a$ and $b$ in the manner already described. This movement is accomplished by a cam element similar in construction to the cam element 40 already described with reference to the movement of the carrier member 10 but operating at an angle of approximately 90° thereto.

As shown in Figure 5, the crust roller 60 is rotatable on an axis or shaft 62, which is carried by a pair of arms 64 and 65 capable of reciprocating back and forth around an axis or shaft 66. The arm 64 is reciprocatably connected through a collar 68, or other suitable means, to a reciprocable shaft 70. The reciprocable shaft 70 is in turn connected to a generally semi-circular element 72 which carries a cam track 74, as shown in Figures 2 and 5. The cam track 74 is in general similar in configuration to the cam track 40, but as previously indicated, comes into operation at a different time. Adjacent the member 72, as shown in Figure 2, is a circular member 76 carrying a fixed pin 78, as shown in Figure 5. This pin moves in the cam track 74. The member 72, carrying the cam track 74, is in turn carried by an arm 80 which reciprocates back and forth to the dotted line position, as shown in Figure 5. The arm 80 is carried in turn by a trunnion 82, which is mounted on the frame 84 of the conveyor system.

The crust roller 60 is provided at opposite ends with a pair of flanges 86 and 88. These flanges are arranged to run over a pair of tracks 90 and 92 which form a part of the crust turner 10, as shown in detail in Figure 6. The shaft 62 is joined to the reciprocating arms 64 and 65 by a pair of collars 94 and 96, in which the shaft 62 is freely mounted. As will be apparent by reference to Figure 1, the collar 96 is placed sufficiently far out on the shaft 62 so that the crust turner 10 can move around the shaft 62 by the provision at one end of the crust turner 10 of a channel 98. As will be seen in Figures 1, 3, 5 and 8, the primary stop for the carrier 10 in the inverted position is stop 101 and when returning to the normal position stops 20 and 22. One end 100 of the channel 98 preferably acts as a supplemental stop for the crust turner 10 in its inverted position by striking against the shaft 62. A cam projection 102 preferably acts as a supplemental stop at the other end when the crust turner is in its crust receiving or normal position, as shown in Figure 5.

The crust roller 60 is caused to move back and forth over the dough carried by the plate members 6 and 8 and the projecting members $a$ and $b$ thereon by the following series of operations. Referring to Figures 2 and 5, it will be seen that the main shaft 4 drives the gear 50, which in turn drives the gear 48 carried on shaft 46. When gear 48 is driven it turns shaft 46 which rotates a pair of cam mechanisms on opposite ends thereof, the one cam mechanism operating the crust turner 10 in the manner previously described and the other operating the crust roller 60. The operation of the crust turner 10, as previously indicated, takes place only during that time when the cam pin 42 is in the circular portion of the track 40 of the cam member 38, as described with reference to Figure 8. During this time the crust roller 10 is at rest in the position shown in Figure 5.

As soon as the crust roller 10 has come to rest in the position shown in Figure 5 and a strip of dough has been placed thereon by any suitable means, either manually or automatically, the cam pin 78 moves into that portion of the cam track 74 between the points 104 and 106. This movement causes the arm 70 to reciprocate and thereby reciprocate the arms 64 and 65. Thereupon, the flanged wheels 86 and 88 of the crust roller 60, shown in Figure 1, move over the tracks 90 and 92, rolling the dough into the openings $a$ and pressing it around the edges on the pins $b$. The crust roller 60 moves to the dotted line position shown in Figure 5, at which time the cam pin 78 is at point 108. Thereafter, the movement of the crust roller 60 is reversed to the full line position and continues until the cam pin 78 again reaches the semi-circular portion of the cam track 74. As soon as the cam pin 78 enters the semi-circular portion of the cam track 74, the movement of the crust roller 60 ceases. At this point, however, the top crust is ready to be brought into position and the movement of the crust carrier 10 begins, whereby the position of the crust carrier 10 changes from the rest position shown in Figure 5 to the discharge position shown in Figure 8, and the crust is discharged onto the top of the pie in the manner previously described. While the crust carrier 10 is moving the crust roller 60 remains stationary and the shaft 62 on which the crust roller 60 rotates is in the channel or slot 98, as shown in Figure 8.

The conveyor mechanism comprises a frame 2 on either side of which is a pair of angle irons 110 and 112 supporting a pair of tracks 114 and 116, as shown in Figure 8. A pair of chains or links belts 118 and 120 move over the tracks 114 and 116, respectively, said movement being caused by a sprocket wheel, not shown, associated with any suitable type of intermittent motion mechanism, not shown, driven from the main drive shaft 4. The chains or link belts 118 and 120 are fastened to opposite sides of a supporting member 122 which in turn is fixed to a vertical supporting member 124. The vertical supporting member 124 is provided with an opening at its upper end which permits the reception of a pie pan 126, as shown in Figure 8. At this stage of the pie making process the pie pan has received the lower crust and the filling. The upper crust 128 is then applied in the manner previously described.

The foregoing description relates generally to the construction and operation of the apparatus. Certain preferred additional embodiments are also included. One of these is a dash pot 130, the operation of which will be better understood by reference to Figures 3, 5 and 8. The purpose of the dash pot 130 is to prevent the crust carrier 10 from returning to its position of rest as described in connection with Figure 5 too rapidly and with too much of a jar. In other words, the dash pot 130 serves as a cushion for the crust carrier 10 when it returns to the crust receiving position. This is accomplished by attaching the upper end of the dash pot to a trunnion 132, as shown in Figures 3 and 5, and connecting the dash pot piston 134 to a shaft 36, which in turn carries the cam member 38, as shown in Figure 5. The shaft 36 also supports one end of the gear carrying arm 34. As previously explained, the crust carrier 10 returns to its crust receiving position shown in Figure 5, from its crust discharge position, shown in Figure 8, when the cam pin 42 is moving from the point 56 to the point 58 of the cam track 40. During this return movement the cam carrying arm 38 is rising. As it rises, the piston 134, working against the fluid contained in the dash pot 130, de-accelerates its movements and thereby slows the movement of the crust carrier 10 so that when it reaches the supports 20 and 22 it comes to rest with substantially no jar.

Another embodiment of the invention which has not heretofore been described is the clutch mechanism for engaging and disengaging the main drive shaft 4 in synchronism with the movement of the conveyor system. This is best shown in the cross sectional view of Figure 2, wherein the main drive shaft 4 has affixed thereto a bearing 136 by means of a set screw 138, or other suitable means. The pinion 50 rotates freely on the main drive shaft 4 around a bearing or bushing 140. In the pinion 50 is a single hole 142. Adjacent the pinion 50 is a collar 144 which is keyed to the main shaft 4 and rotates continuously therewith. The collar 144 contains a pin 146, one end of which rotates in a groove or channel 148. Pin 146 is adapted to engage with hole 142 of the pinion 50. Adjacent the collar 144 is another collar 150 carrying the track or groove 148. The collar 150 is mounted for free rotation on drive shaft 4 and carries another track or groove 152. A pair of arms 154 and 156, provided with pins 158 and 160, are adapted to fasten around the groove 152 so that the pins 158 and 160 will rotate therein. These arms 154 and 156 are part of a bifurcated member pivoted for turning on a shaft 155 supported by the frame (Figures 3 and 5). The arm 156 is fastened to a rod or lever 162, as shown in Figure 3, by means of a pin 164. The other end of rod 162 is fastened to a crank arm 163 (Figure 1) which is fixed to shaft 165 supported from the frame as shown in Figure 1. On the outer end of shaft 165 is a crank 166. When the crank 166 is rotated counterclockwise it turns shaft 165 which turns crank arm 163 thereby moving arm 162, which in turn pulls arm 156 (Figure 3) and slides the collar 150 and the pin 146 away from the opening 142. When the crank lever 166 is rotated in the opposite direction, it causes the pin 146 to engage the opening 142. As long as the pin 146 is out of engagement with the opening 142 there is no connection between the main shaft 4 and the driven gear 48, because the gear 50 rotates freely on the main shaft 4. When the clutch is disengaged the collar 144 rotates. The collar 150 does not rotate because the head pin 146 runs in groove 148. However, as soon as the pin 146 engages the opening 142, the gear 50 is keyed to the collar 144 and the operation of the mechanism begins. When the clutch is engaged, the frictional engagement of collar 150 with collar 144 causes the former to rotate but arms 154 and 156 are prevented from rotation by pins 158 and 160 moving in track 152.

An important feature of the invention is that only a single hole 142 is employed in the gear 50 because of the necessity for syncronizing the movement of the crust applying mechanism with the movement of the conveyor mechanism. As will be apparent this syncronism is such that a pie crust is not discharged until the conveyor mechanism brings a pie pan bearing the lower crust and the filling beneath or opposite the point at which the top crust is applied.

Another feature of the invention not heretofore described is the removability of the plate-like members 6 and 8 as shown in Figure 6. This is accomplished by means of a latch mechanism, shown in detail in Figure 7. As shown in Figure 7, the lower plate 8 is provided with a hole 168 which is engageable by a finger 170 forming one end of a latch 172 pivoted at point 174 by means of a pin supported by a pair of carrying members 176 and 178, the carrying member 178 being a part of the frame of the crust carrier 10. On the upper side of the latch 172 is a spring 180 which normally urges the finger 170 into the hole 168. The finger 170 is disengaged from the hole 168 merely by pulling upwardly on the handle 182 of the latch bar 172 while at the same time pulling outwardly on the plate assembly. It will be observed that the lower plate 8 slides beneath the tracks 90 and 92 and thus is held in position against lateral movement. The forward movement of the lower plate is prevented by means of a stop 184, as shown in Figure 1. The upper plate 6, being associated with the lower plate 8 by bolts c (Figure 6), is held in the same relative position when the lower plate 8 is removed. Thus, when the latch is released, the entire assembly may be removed as a unit by sliding the lower plate 8 from beneath the track members 90 and 92.

In connection with the operation of the crust roller 60, an important feature of the invention is the provision of resilient means for pressing the crust roller against the top of the dough sheet, or other sheet component, carried by the plate-like elements 6 and 8. It will be observed that the crust roller 60 would ordinarily move in an arcuate path except for the provision of the resilient means hereinafter described which enable it to move in a plane path and to press the dough sheet into the marking elements a and onto the pins b. This is accomplished in accordance with the invention by the provision of channels f and $f_1$ in the upper ends of the rods 64 and 65, respectively. In these channels the shaft 62 which supports the crust roller 60 is mounted on a pair of blocks g and $g_1$ which are normally urged in a downward direction by a pair of springs h and $h_1$. In the position shown in Figure 5 the roller is resting against the top of the crust carrier and hence, the blocks g and $g_1$, although urged in a downward direction by the springs h and $h_1$, respectively, do not cause any downward movement of the roller 60. However, as soon as the reciprocation of the roller begins, it is urged away from its normally arcuate path by the action of the springs h and $h_1$. A pair of plates k and $k_1$ is provided around the channel f on rod 64 and a similar pair of plates l and $l_1$ is provided to enclose the channel $f_1$ on rod 65 to prevent dough fragments or other material from clogging the channels and thereby interfering with the movement of the roller 60.

It will be understood that many variations and modifications may be made in the apparatus described without departing from the invention. For example, one method of operation is to drive the shaft 4 and to drive the intermittent motion mechanism of the conveyor system and the crust applying mechanism from the shaft 4, as already described. Another method of operation is to drive the intermittent motion mechanism directly from a motor and to drive the main shaft 4 by a power take-off from the intermittent motion mechanism of the conveyor system. In either case it will be understood that the conveyor system is always driven in syncronism with the mechanism for supplying the dough sheet.

In the particular embodiment shown in the drawings the gear teeth 30 are held against pinion 28 by a roller 31. It will be understood that instead of a roller, any other suitable type of support such as an arm or plate may be employed.

One feature of the invention which has not been mentioned heretofore is the particular construction of the cam arm 38 with one leg shorter than the other. In this manner the operation of the machine takes place in such a way that the crust carrier 10 is returned to its initial or normal position more rapidly than it is inverted just prior to the discharge of the dough sheet.

The various portions of the frame have not been described in detail because it is believed that their construction will be readily understood by anyone skilled in the art. It might be noted that there is a hole or opening A in the housing or frame (Figures 3 and 5) through which portions of the driving mechanism project. A strip B supports the pivot 155 of the carrying arms 154 and 156.

The invention is particularly advantageous for supplying a top crust with a marking or design in it to a partially prepared pie. As will be recognized, the preparation and application of a dough sheet containing substantial openings or markings therein presents a special problem because of the tendency of the dough to become distorted when it is handled, thereby destroying the design. Furthermore, dough sheets are more or less sticky or adherent and hence, hard to handle.

One feature of the invention is the positive discharge of the dough sheet at its point of application. This is accomplished primarily by the arrangement of the plates 6 and 8 whereby the plate 6 slides downwardly by gravity when the carrier 10 is inverted. The loosening of the dough sheet is preferably assisted somewhat by having the carrier 10 hit the stop 101 with a substantial jar. The jarring effect is preferably generalized rather than localized by having the end 100 of the channel 98 strike against the shaft 62 substantially simultaneously. It will be understood, however, that the device may be operated without this latter expedient. The jarring effect created is naturally insufficient to throw the various parts of the apparatus out of alignment.

The invention is not limited to any specific marking or design such as the particular arrangement of the elements as in Figure 1. Although the invention is especially useful for applying marked or design-bearing dough sheets, it will be understood that it is applicable to the application of plain crusts or dough sheets. In this case the sheet may be held on the carrier 10 by the peripheral perforating projection b, preferably with the addition of several central projections, or other suitable means.

Having thus described the invention, what we claim as new and desire to secure by Letters Patent of the United States is:

1. In combination with an intermittently moving conveyor system for preparing a pastry, a device for supplying a dough sheet component to said pastry, said device comprising a carrier for said dough sheet component, carrier moving means for moving said carrier from a receiving position for said dough sheet component to a discharging position, a driving mechanism and means operatively associated with said driving mechanism for actuating said carrier moving means during intervals when the conveyor is at rest.

2. In combination with an intermittently moving conveyor system for preparing a pastry, a device for supplying a dough sheet component to a pastry product while the latter is being carried on the conveyor system, said device comprising a carrier for said dough sheet component, inverting means for inverting said carrier over the partially prepared pastry while the latter is being carried on the conveyor system and for returning the carrier to its starting position, a driving mechanism, and means operatively associated with said driving mechanism for actuating said inverting means during intervals when the conveyor is at rest.

3. In combination with an intermittently moving conveyor system for preparing a pastry, a device for supplying a sheet component to the partially prepared pastry while the latter is being carried on the conveyor system, said device comprising a carrier for said sheet component, inverting means associated with said carrier for inverting it and returning it to its normal position, means associated with said carrier for holding said component sheet thereon while the carrier is being inverted, a driving mechanism, and means operatively associated with said driving mechanism for actuating said inverting means during intervals when the conveyor is at rest.

4. In combination with a conveyor system for preparing a pastry, a device for supplying a sheet component to said pastry, said device comprising a carrier for said sheet component, moving means for moving said carrier from a receiving position for said sheet component to a discharging position, means for positively discharging said sheet component from said carrier when it reaches said discharging position, a driving mechanism and means operatively associated with said driving mechanism for actuating said carrier moving means at predetermined intervals.

5. In combination with a conveyor system for preparing a pastry, a device for supplying a sheet component to the partially prepared pastry while the latter is being carried on the conveyor system, said device comprising a carrier for said sheet component, a roller arranged to roll over said carrier, means for causing said carrier to deposit said sheet component on the partially prepared pastry while the latter is being carried on the conveyor system and for returning said carrier to its normal position, a driving mechanism, and means operatively associated with said driving mechanism for actuating said roller and carrier at predetermined intervals in synchronism with each other whereby said roller is actuated only when said carrier is in its normal position.

6. A device for supplying a dough sheet component to a pastry product, said device comprising a carrier for said dough sheet component, means for inverting said carrier over a receptacle thereby to discharge said dough sheet component from said carrier in superposed relationship with respect to said receptacle and means for positively discharging said dough sheet from said carrier.

7. A device for supplying a sheet component to a pastry product, said device comprising a carrier for said sheet component, inverting means associated with said carrier for inverting it and returnnig it to its normal position, means associated with said carrier for holding said sheet component thereon while the carrier is being inverted, and means for positively discharging said sheet component from said carrier when said carrier reaches its inverted position.

8. A device for supplying a sheet component to a pastry product, said device comprising a carrier for said sheet component, a roller adapted to roll said sheet component on said carrier, means for inverting said carrier thereby to deposit said sheet component in a predetermined position, means for returning said carrier to its normal position, and means associated with said roller and said carrier whereby said roller can be rolled over said carrier only when the carrier is in its normal position.

9. A device for supplying a top crust to a pie, said device comprising a carrier for said top crust, a roller arranged to roll over said crust on said carrier, means for causing said carrier to deposit said crust on the pie and for returning said carrier to its normal position, a driving mechanism and means operatively associated with said driving mechanism for actuating said roller and carrier at predetermined intervals in synchronism with each other whereby said roller is actuated only when said carrier is in its normal crust receiving position.

10. A device for supplying a sheet component for a pastry product, said device comprising a carrier for said sheet component, a roller arranged to roll over said carrier, means for causing said carrier to be inverted and deposit said sheet component in a receptacle, and resilient means pressing said roller against said carrier.

11. A device for supplying a sheet component for a pastry product, said device comprising a carrier for said sheet component, inverting means associated with said carrier for inverting it and returning it to its normal position, and means to cause said carrier to come to a rest with a jar when it reaches its inverted position.

12. A device for supplying a sheet component for a pastry product, said device comprising a carrier for said sheet component, inverting means associated with said carrier for inverting it and returning it to its normal position, and means for returning said carrier to its normal position at a rate faster than its rate of inversion.

13. An assembly for preparing a pie crust having a cut or perforated design, said assembly comprising a pair of plate members one above the other, the one member being adapted to receive a dough sheet on the upper side thereof, the other member having design cutters therein extending through openings in the first member a sufficient distance to cut the design in said dough sheet, and means permitting said members to separate from each other a fixed distance whereby the separation of said members effects the discharge of said dough sheet from said design cutters.

14. In combination with a conveyor system for preparing pastry, a device for supplying a sheet component to the partially prepared pastry while the latter is being carried on the conveyor system, said device comprising a carrier for said sheet component, inverting means associated with said carrier for inverting it and returning it to its normal position, a plurality of design cutters associated with said carrier for holding said component sheet thereon while the carrier is being inverted, a driving mechanism, and means operatively associated with said driving mechanism for actuating said inverting means at predetermined intervals.

15. In combination with a conveyor system for preparing pastry, a device for supplying a sheet component to the partially prepared pastry while the latter is being carried on the conveyor system, said device comprising a carrier for said sheet component, inverting means associated with said carrier for inverting it and returning it to its normal position, a plurality of peripheral perforating projections associated with said carrier for holding said component sheet thereon while the carrier is being inverted, a driving mechanism, and means operatively associated with said driving mechanism for actuating said inverting means at predetermined intervals.

16. A device for supplying a sheet component for a pastry product, said device comprising a carrier for said sheet component, a roller arranged to roll over said carrier and mounted to reciprocate back and forth thereover in an arcuate path, means for causing said carrier to deposit said sheet component in a receptacle, and resilient means pressing said roller against said carrier to cause it to deviate from said arcuate path and follow the surface of said carrier.

17. In combination with an intermittently moving conveyor system for preparing pies, a device for supplying a top crust to a pie, said device comprising a carrier for said top crust, carrier moving means for moving said carrier from a receiving position for said top crust to a discharging position, a driving mechanism and means operatively associated with said driving mechanism for actuating said carrier moving means during intervals when the conveyor is at rest.

LLOYD J. HARRISS.
BERNARD LAMBERS.